US012711768B1

(12) United States Patent
Kaplan et al.

(10) Patent No.: US 12,711,768 B1
(45) Date of Patent: Aug. 18, 2026

(54) SYSTEM AND METHOD FOR AUTOMATICALLY GENERATING PERSONALIZED SERVICE OFFERS BASED ON A VIDEO ANALYSIS

(71) Applicant: Faireez—Cleaning Fairies Ltd, Ramat-HaSharon (IL)

(72) Inventors: Gil Kaplan, Tel Aviv (IL); Omer Agiv, Ramat-HaSharon (IL); Ori Fingerer, Tel Aviv (IL)

(73) Assignee: Faireez—Cleaning Fairies Ltd, Ramat-HaSharon (IL)

( * ) Notice: Subject to any disclaimer, the term of this patent is extended or adjusted under 35 U.S.C. 154(b) by 0 days.

(21) Appl. No.: 19/530,569

(22) Filed: Feb. 5, 2026

(51) Int. Cl.

| | |
|---|---|
| ***G06V 20/40*** | (2022.01) |
| ***G06F 3/04845*** | (2022.01) |
| ***G06N 20/00*** | (2019.01) |
| ***G06V 10/762*** | (2022.01) |
| ***G06V 10/764*** | (2022.01) |
| ***G06V 10/774*** | (2022.01) |

(52) U.S. Cl.
CPC .......... *G06V 20/46* (2022.01); *G06F 3/04845* (2013.01); *G06N 20/00* (2019.01); *G06V 10/762* (2022.01); *G06V 10/764* (2022.01); *G06V 10/774* (2022.01); *G06V 2201/07* (2022.01)

(58) Field of Classification Search
CPC .... G06F 3/04845; G06N 20/00; G06V 20/46; G06V 10/762; G06V 10/764; G06V 10/774; G06V 2201/07
See application file for complete search history.

(56) References Cited

U.S. PATENT DOCUMENTS

| | | | | |
|---|---|---|---|---|
| 12,080,068 | B2 * | 9/2024 | Gautam | G06F 18/217 |
| 12,272,448 | B1 * | 4/2025 | Forehand | G16H 10/60 |
| 12,578,693 | B1 * | 3/2026 | Murphy | G05B 13/027 |
| 2018/0130260 | A1 * | 5/2018 | Schmirler | G06F 3/011 |

(Continued)

OTHER PUBLICATIONS

A. González-Vidal, J. Mendoza-Bernal, S. Niu, A. F. Skarmeta and H. Song, "A Transfer Learning Framework for Predictive Energy-Related Scenarios in Smart Buildings," in IEEE Transactions on Industry Applications, vol. 59, No. 1, pp. 26-37, Jan.-Feb. 2023, doi: 10.1109/TIA.2022.3179222. (Year: 2023).*

*Primary Examiner* — Delomia L Gilliard

(57) ABSTRACT

There is provided a method of processing a video for generating a graphical user interface (GUI) presenting personalized services for cleaning a property, comprising: receiving the video depicting an interior of the property comprising rooms, extracting frame-level features from frames of the video on a per-frame basis, generating structured frame-level metadata from the frame-level features on the per-frame basis, clustering structured frame-level metadata into clusters according to a type of room, temporally aggregating the structured frame-level metadata of the frames of each cluster corresponding to each type of room to generate a structured room-level metadata for each room represented by each cluster, feeding each structured room-level metadata into a ML model(s) for predicting a cleaning task(s) and a corresponding duration for completing each cleaning task, and generating and presenting on a display of a client terminal, the cleaning task(s) and corresponding estimated durations within the GUI.

23 Claims, 4 Drawing Sheets

(56) References Cited

U.S. PATENT DOCUMENTS

| | | | | |
|---|---|---|---|---|
| 2019/0213438 | A1* | 7/2019 | Jones | G06V 20/10 |
| 2020/0050995 | A1* | 2/2020 | Ramanand | G06Q 10/06395 |
| 2021/0004021 | A1* | 1/2021 | Zhang | G06T 19/00 |
| 2022/0327402 | A1* | 10/2022 | Tiwari | G06F 18/22 |
| 2024/0135298 | A1* | 4/2024 | Ramanand | G06Q 10/06395 |
| 2024/0288870 | A1* | 8/2024 | Hori | G10L 15/16 |
| 2024/0362301 | A1* | 10/2024 | Segev | G06F 18/2415 |
| 2025/0062013 | A1* | 2/2025 | Farren | G16H 40/20 |
| 2025/0157636 | A1* | 5/2025 | Khodayi Mehr | G16H 20/40 |
| 2025/0209309 | A1* | 6/2025 | Matamoros | G06V 20/70 |

* cited by examiner

SYSTEM AND METHOD FOR AUTOMATICALLY GENERATING PERSONALIZED SERVICE OFFERS BASED ON A VIDEO ANALYSIS

BACKGROUND

The present invention, in some embodiments thereof, relates to video processing and, more specifically, but not exclusively, to a machine learning model for analyzing a video.

Traditional video analysis methods rely on rule-based algorithms and computer vision techniques such as edge detection, optical flow analysis, and template matching. These conventional approaches typically require manual feature engineering, wherein domain experts define specific visual features to detect.

SUMMARY

According to a first aspect, a computer implemented method of processing a video for generating a graphical user interface (GUI) presenting personalized services for cleaning a property, comprises: receiving the video captured by a camera depicting an interior of the property comprising a plurality of rooms, extracting frame-level features from a plurality of frames of the video on a per-frame basis, generating structured frame-level metadata from the plurality of frame-level features on the per-frame basis, clustering a plurality of the structured frame-level metadata into a plurality of clusters according to a type of room, temporally aggregating the structured frame-level metadata of the frames of each cluster corresponding to each type of room to generate a structured room-level metadata for each room represented by each cluster, feeding each structured room-level metadata into at least one ML model for predicting at least one cleaning task and a corresponding duration for completing each cleaning task, and generating and presenting on a display of a client terminal, the at least one cleaning task and corresponding estimated durations within the GUI.

According to a second aspect, a system for processing a video for generating a graphical user interface (GUI) presenting personalized services for cleaning a property, comprises: at least one processor executing a code for: receiving the video captured by a camera depicting an interior of the property comprising a plurality of rooms, extracting frame-level features from a plurality of frames of the video on a per-frame basis, generating structured frame-level metadata from the plurality of frame-level features on the per-frame basis, clustering a plurality of the structured frame-level metadata into a plurality of clusters according to a type of room, temporally aggregating the structured frame-level metadata of the frames of each cluster corresponding to each type of room to generate a structured room-level metadata for each room represented by each cluster, feeding each structured room-level metadata into a ML model for predicting at least one cleaning task and a corresponding duration for completing each cleaning task, and generating and presenting on a display of a client terminal, the at least one cleaning task and corresponding estimated durations within the GUI.

According to a third aspect, a computer implemented method of training a ML model for predicting at least one cleaning task and a corresponding duration for completing each cleaning task from a video, comprises: generating a training dataset comprising a plurality of records, wherein a record includes: a sample structured room-metadata, and a ground truth of at least one sample cleaning task and corresponding duration for completing each sample cleaning task, wherein the sample structured room-level metadata is generated by: receiving a video captured by a camera depicting an interior of a sample property comprising a plurality of sample rooms, extracting frame-level features from a plurality of frames of the video on a per-frame basis, generating structured frame-level metadata from the plurality of frame-level features on the per-frame basis, clustering a plurality of the structured frame-level metadata into a plurality of clusters according to a type of room, and temporally aggregating the structured frame-level metadata of the frames of each cluster corresponding to each type of room to generate the sample structured room-level metadata for each room represented by each cluster, and training the ML model on the training dataset for predicting at least one target cleaning task and a corresponding target duration for completing each target cleaning task in response to an input of a target structured cluster-level metadata computed from a target video.

In a further implementation form of the first, second, and third aspects, further comprising training the at least one ML model by generating a training dataset comprising a plurality of records, wherein a record includes: a sample structured room-metadata, and a ground truth of at least one sample cleaning task and corresponding duration for completing each sample cleaning task, wherein the sample structured room-level metadata is generated by: receiving a video captured by a camera depicting an interior of a sample property comprising a plurality of sample rooms, extracting frame-level features from a plurality of frames of the video on a per-frame basis, generating structured frame-level metadata from the plurality of frame-level features on the per-frame basis, clustering a plurality of the structured frame-level metadata into a plurality of clusters according to a type of room, temporally aggregating the structured frame-level metadata of the frames of each cluster corresponding to each type of room to generate the sample structured room-level metadata for each room represented by each cluster, and training the ML model on the training dataset for predicting at least one target cleaning task and a corresponding target duration for completing each target cleaning task in response to an input of a target structured cluster-level metadata computed from a target video.

In a further implementation form of the first, second, and third aspects, the frame-level features are extracted by: at least one of: feeding the frame into a room classification model to obtain a type of room, and feeding the frame into a detector model for detecting at least one object and at least one surface.

In a further implementation form of the first, second, and third aspects, detecting at least one surface comprises detecting a plurality of different types of surfaces and classifying the plurality of different types of surfaces, including: floor, tables, beds, and counters, wherein the plurality of features are computed according to the plurality of different types of surfaces.

In a further implementation form of the first, second, and third aspects, the plurality of frame-level features include at least a type of room, and the clustering is performed according to the types of rooms.

In a further implementation form of the first, second, and third aspects, further comprising: mapping features of the structured room-level metadata of each room to at least one cleaning task, to obtain a plurality of cleaning tasks for a plurality of rooms, wherein feeding comprises feeding each at least one cleaning task and corresponding structured room-level metadata into the ML model for estimating the duration for completing each cleaning task.

In a further implementation form of the first, second, and third aspects, the GUI includes at least one interactive element for selecting a subset of at least one cleaning task, and for automatically scheduling a cleaning service for performing the selected subset of the at least one cleaning task.

In a further implementation form of the first, second, and third aspects, further comprising receiving a message from the client terminal in response to interaction with the interactive element presented in the GUI, and automatically scheduling the cleaning service for performing the selected subset of the at least one cleaning task.

In a further implementation form of the first, second, and third aspects, the structured room-level metadata includes measured room size and/or measured room cleanliness.

In a further implementation form of the first, second, and third aspects, the measured room cleanliness is computed as a combination of at least one of: number of objects to pick up, variety of different objects in the room, required sorting, required folding.

In a further implementation form of the first, second, and third aspects, the at least one cleaning task comprise predefined cleaning tasks selected from: sweeping, mopping, dishwashing.

In a further implementation form of the first, second, and third aspects, extracting is performed by a detector model implemented as a semantic segmentation model generating a plurality of classifications for pixels of the frame.

In a further implementation form of the first, second, and third aspects, the room type is selected from: living room, kitchen, bedroom, bathroom, hallway, and office.

In a further implementation form of the first, second, and third aspects, the video is captured by the camera integrated with and/or connected to a mobile device, and the at least one cleaning task is presented on the display of the mobile device.

In a further implementation form of the first, second, and third aspects, the method is executed by a server in network communication with a plurality of mobile devices.

In a further implementation form of the first, second, and third aspects, further comprising feeding the at least one cleaning task, corresponding estimated durations, and at least one current parameter into a pricing engine configured for dynamically computing costs for performing each of the at least one cleaning task, and presenting the computed costs within the GUI on the display of the client terminal.

In a further implementation form of the first, second, and third aspects, the at least one current parameter is selected from: base labor cost, regional adjustment, supply-demand factor, and discount as part of a promotion.

In a further implementation form of the first, second, and third aspects, further comprising pre-processing the plurality of frames of the video for normalizing resolution and/or lighting conditions.

In a further implementation form of the first, second, and third aspects, further comprising presenting within the GUI, a plurality of interactive elements configured for a user to enter feedback regarding the at least one cleaning task including actual duration to complete the at least one cleaning task, and performing an update of models for future predictions according to the feedback.

In a further implementation form of the first, second, and third aspects, further comprising generating and presenting on a display of a client terminal, at least one personalized message based on the at least one cleaning task and corresponding estimated durations within the GUI, the at least one personalized message selected from: a personalized advertisement, a personalized promotion, and a personalized bundle.

In a further implementation form of the first, second, and third aspects, further comprising: computing a confidence score for the extracted frame-level features, and in response to the confidence score being below a threshold, dynamically presenting with the GUI, instructions within the GUI to at least one of: zoom in on specific areas, capture missing angles, and/or provide additional angular coverage, predicted to increase the confidence score, wherein the receiving the video, the extracting frame-level features, and the computing the confidence score, are iterated until the confidence score exceeds the threshold.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
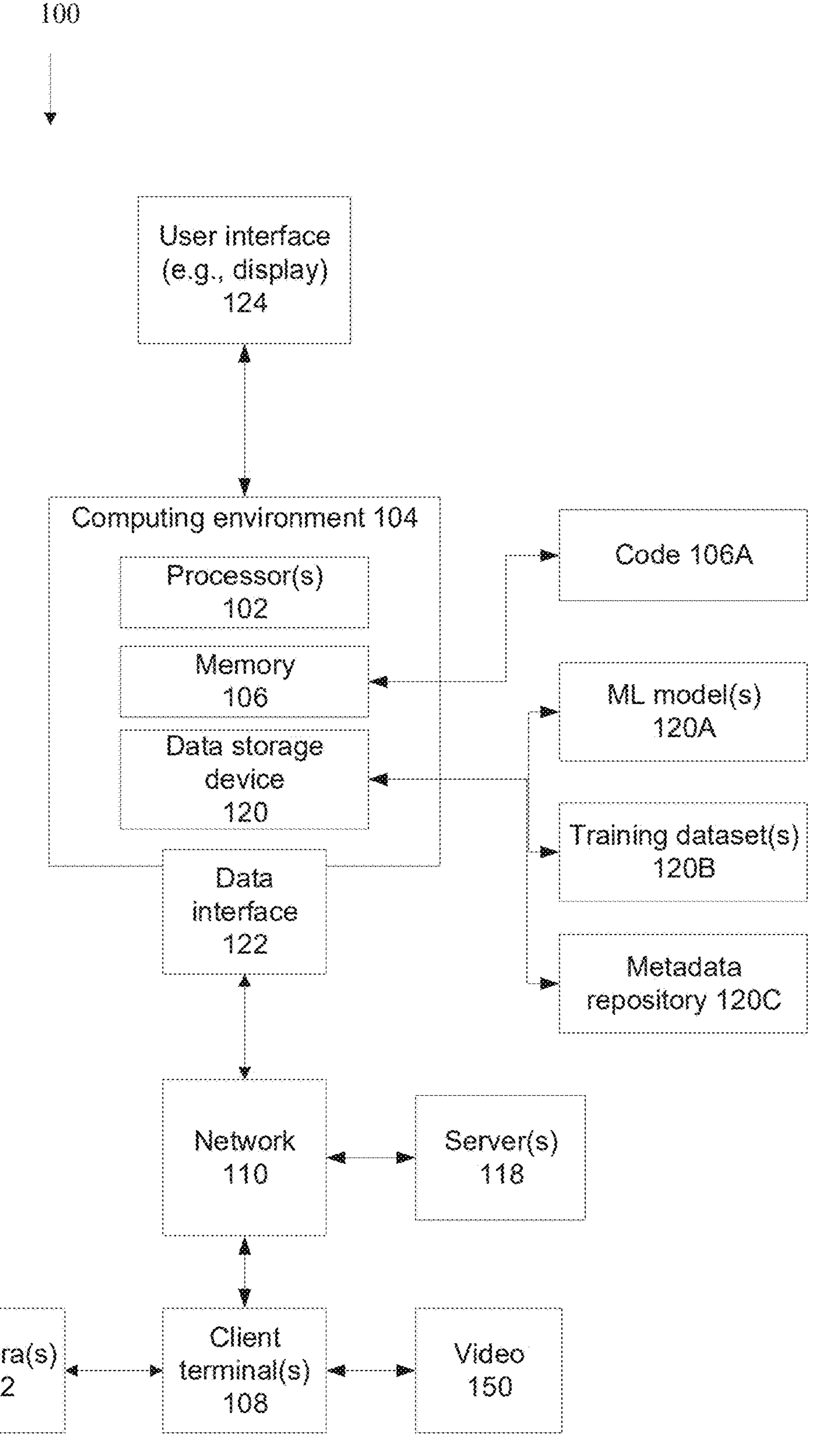
FIG. 1 is a block diagram of components of a system for using a ML model and/or for training the ML model for processing a video for predicting personalized services for cleaning a property, in accordance with some embodiments of the present invention.

The present invention, in some embodiments thereof, relates to video processing and, more specifically, but not exclusively, to a machine learning model for analyzing a video.

An aspect of some embodiments of the present invention relates to systems, methods, computing devices, and/or code instructions (e.g., stored on a data storage device and executable by one or more processors) for processing a video depicting an interior of a property that includes multiple rooms, for example, an apartment, a house, a commercial center, an office, and the like. The video may be captured by a camera integrated with a mobile device. Frame-level features are extracted from one or more frames of the video on a per-frame basis. Structured frame-level metadata is generated for each respective frame based on the frame-level features on the per-frame basis. The structured frame-level metadata may be clustered into multiple clusters according to a type of room, where each cluster is associated with structured frame-level metadata of a different room of the property. The clustering may be performed by clustering the frames into room types, where each frame in the cluster is associated with the structured frame-level metadata generated for the corresponding frame. The structured frame-level metadata of the frames of each respective cluster (corresponding to a respective room) are temporally aggregated to generate a respective structured room-level metadata for the respective room of the corresponding cluster. Each structured room-level metadata (corresponding to each room of the property) is fed into one or more machine learning (ML) models. The ML model(s) generate a prediction of at least one cleaning task for cleaning the room corresponding to the inputted structured room-level metadata, and optionally a corresponding duration for completing each cleaning task. The ML model(s) may generate additional data, for example, predicted equipment and/or cleaning products to perform the cleaning task, and/or predicted cost(s). The cleaning task(s), optional corresponding estimated duration(s) and/or other data may be presented within a graphical user interface (GUI). The GUI may be designed to enable a user to perform functions with respect to the predicted cleaning tasks, for example, schedule a cleaner to perform the cleaning task(s).

As used herein, the phrases "structured frame-level metadata" and "structured room-level metadata" may refer to data organized in a predefined schema and/or format that enables efficient storage, retrieval, and/or processing, for example, by machine learning models. The structured metadata may be represented as one or more of: (i) a feature vector of fixed dimension containing numerical values, (ii) a key-value data structure (e.g., JSON, XML, or dictionary object) with predefined keys corresponding to feature types, (iii) a relational database record with defined fields and data types, or (iv) a graph structure with nodes representing entities (e.g., objects, surfaces) and edges representing relationships. In contrast to unstructured data such as raw pixel values of images, structured metadata provides a compact, semantically meaningful representation that requires significantly less computational resources for processing by ML models.

An aspect of some embodiments of the present invention relates to systems, methods, computing devices, and/or code instructions (e.g., stored on a data storage device and executable by one or more processors) for training a ML model for predicting at least one cleaning task for cleaning a room in a property, and optionally a corresponding duration for completing each cleaning task, based on an analysis of a video depicting an interior of the property that includes multiple rooms. A training dataset of multiple records is generated. A record may be generated for each different room in the property. The record includes a sample structured room-metadata for the specific room, and a ground truth of at least one sample cleaning task for cleaning the specific room. The ground truth may include corresponding durations for completing each sample cleaning task. The ground truth may include other data for prediction, as described herein. The sample structured room-level metadata for each different room may be generated by receiving a video captured by a camera depicting an interior of a sample property that includes multiple sample rooms. Frame-level features are extracted from frames of the video on a per-frame basis. Structured frame-level metadata is generated for each frame on the per-frame basis. The structured frame-level metadata of the multiple frames are clustered into multiple clusters according to a type of room. Each cluster corresponding to a different room of the property. The structured frame-level metadata of the frames of each cluster are temporally aggregated to generate the sample structured room-level metadata for the specific room represented by the respective cluster. The ML model is trained on the training dataset. The ML model is trained for predicting at least one target cleaning task and optionally a corresponding target duration for completing each target cleaning task and/or for predicting other data, in response to an input of a target structured cluster-level metadata computed from a target video.

At least one embodiment described herein addresses the technical problem of objectively generating one or more cleaning tasks and optional related data for cleaning each one of multiple different rooms of a property by analyzing an image captured by a camera. At least one embodiment described herein improves the technology of image processing, by providing approaches for analyzing a video for objectively generating one or more cleaning tasks and optional related data for cleaning each one of multiple different rooms of a property depicted in the video. At least one embodiment described herein improves upon prior approaches, for example, manual estimates which are subjective and prone to error and/or inaccuracies. At least one embodiment described herein provides the practical application of objectively predicting one or more cleaning tasks and optional related data for cleaning each one of multiple different rooms of a property.

At least one embodiment described herein addresses the technical problem of improving computational efficiency of a computer (e.g., processor) that trains and/or performs inference by a ML model that analyzes a video depicting a multi-room property for predicting one or more cleaning tasks and optional related data for cleaning each one of the different rooms of the property. At least one embodiment described herein improves the technology of ML models, by improving computational efficiency of a computer (e.g., processor) that trains and/or performs inference by a ML model that analyzes a video depicting a multi-room property for predicting one or more cleaning tasks and optional related data for cleaning each one of the different rooms of the property. At least one embodiment described herein provides the practical application of improving computational efficiency of a computer (e.g., processor) that trains and/or performs inference by a ML model that analyzes a video depicting a multi-room property for predicting one or more cleaning tasks and optional related data for cleaning each one of the different rooms of the property.

At least one embodiment described herein solves the aforementioned technical problem, and/or improves the aforementioned technical field, and/or improves upon the aforementioned prior approach, and/or provides the aforementioned practical application, by processing a video depicting an interior of a property that includes multiple rooms. Frame-level features are extracted from one or more frames of the video on a per-frame basis. Structured frame-level metadata is generated for each respective frame based on the frame-level features on the per-frame basis. The structured frame-level metadata may be clustered into multiple clusters according to a type of room, where each cluster is associated with structured frame-level metadata of a different room of the property. The structured frame-level metadata of the frames of each respective cluster (corresponding to a respective room) are temporally aggregated to generate a respective structured room-level metadata for the respective room of the corresponding cluster. Each structured room-level metadata (corresponding to each room of the property) is fed into one or more machine learning (ML) models. The ML model(s) generate a prediction of at least one cleaning task for cleaning the room corresponding to the inputted structured room-level metadata, and optionally a corresponding duration for completing each cleaning task.

At least one embodiment described herein solves the aforementioned technical problem, and/or improves the aforementioned technical field, and/or improves upon the aforementioned prior approach, and/or provides the aforementioned practical application, by training a ML model for predicting at least one cleaning task for cleaning a room in a property, and optionally a corresponding duration for completing each cleaning task, based on an analysis of a video depicting an interior of the property that includes multiple rooms. A training dataset of multiple records is generated. A record may be generated for each different room in the property. The record includes a sample structured room-metadata for the specific room, and a ground truth of at least one sample cleaning task for cleaning the specific room. The ground truth may include corresponding durations for completing each sample cleaning task. The sample structured room-level metadata for each different room may be generated by receiving a video captured by a camera depicting an interior of a sample property that includes multiple sample rooms. Frame-level features are extracted from frames of the video on a per-frame basis. Structured frame-level metadata is generated for each frame on the per-frame basis. The structured frame-level metadata of the multiple frames are clustered into multiple clusters according to a type of room. Each cluster corresponding to a different room of the property. The structured frame-level metadata of the frames of each cluster are temporally aggregated to generate the sample structured room-level metadata for the specific room represented by the respective cluster. The ML model is trained on the training dataset.

In at least one embodiment, the ML model that is trained on and/or processes structured room-level metadata, for example, in contrast to directly processing the frames of the video. Processing metadata, which may be represented more compactly and/or simply that images, for example, as text, requires significantly fewer computational resources (e.g., processor utilization, memory, data storage, and/or processing time) to process by the ML model in comparison to computational resources required by an ML model to process images.

At least one embodiment described herein solves the aforementioned technical problem, and/or improves the aforementioned technical field, and/or improves upon the aforementioned prior approach, and/or provides the aforementioned practical application, by processing a video depicting an interior of multiple rooms of a property, in comparison to, for example, analyzing a single frame. The use of video rather than single still images enables achieving reliable and/or actionable room-level understanding.

Single-image analysis is insufficient for addressing the aforementioned problem(s) because a single frame captures only one viewpoint, typically with partial visibility of surfaces, occlusions, lighting artifacts, and/or perspective distortion. In contrast, a video provides multi-angle, multi-distance, and/or multi-context observations of the same room, which are used to accurately infer, for example: surface coverage, cleanliness level, and/or cleaning complexity for the suggested clean service.

In at least one embodiment, a video is processed as a temporal sequence of frames, where each frame is analyzed independently to extract low-level visual features such as spatial features, texture features, color histograms, edge descriptors, and/or semantic labels (e.g., detected objects, surfaces, number of items to clean, and candidate room-type signals), which are aggregated across temporally spaced frames captured over a time interval to generate a stable and/or consistent room-level representation, for example, with reduced frame-to-frame variance compared to individual frame-level features. Frame-level analysis produces structured frame-level metadata, including, for example, object detections, surface classifications, and/or spatial relationships. Per-frame outputs are aggregated across multiple frames belonging to the same room. Temporal aggregation addresses several key technical challenges, for example:

- Multiple detections of the same object across frames may be deduplicated using, for example, spatial overlap, temporal persistence, and/or confidence scoring, preventing inflation of object counts.
- Surface coverage estimation may improve as different camera angles expose previously hidden portions of, for example, floors, counters, tables, beds, items in sink, and/or other surfaces that are rarely fully visible in a single image.
- Room size and layout estimation may be approximated by accumulating segmented surfaces and/or relative object scale across frames, optionally incorporating camera motion, for yielding significantly more reliable estimates than single-frame inference.
- Cleanliness and cleaning difficulty estimation benefits from observing, for example, clutter patterns, surface exposure, and/or object distribution across viewpoints, for enabling differentiation between light, moderate, and deep cleaning needs.

Video also enables guided capture, which is not possible with still images. In at least one embodiment the system can dynamically prompt the user, for example, via the client application running on the mobile device and/or via the GUI, such as to zoom in on specific areas, capture missing angles, and/or provide additional angular coverage (e.g., about 180° or 360° or other values) coverage of a room when a confidence score computed for the extracted features (e.g., by analysis code and/or a specialized AI-agent) is insufficient, such as below a threshold. The dynamic prompt may be computed e.g., by analysis code and/or a specialized AI-agent) based on a prediction that perform the zoom, capturing missing angles, and/or providing additional angular coverage, will increasing the confidence score above the threshold. The specialized AI-agent may be trained on a training dataset of sample videos, metadata of zoom, captured angles, and/or angular coverage, and corresponding confidence scores—the confidence scores and/or metadata may serve as ground truth. The confidence score may be iteratively computed (e.g., based on a closed-loop interaction) based on the newly captured frames, until the confidence score increased above the threshold. This closed-loop interaction may improve data quality and/or ML model confidence.

Once frame-level metadata is aggregated, a structured room-level summary for each room is generated. The structured room-level summary encodes consolidated features, for example, detected surface types, estimated surface area, object density and types, inferred cleanliness level, and/or inferred cleaning difficulty. The structured room-level metadata is stable, compact, and/or independent of the raw video and/or individual frames.

At least one embodiment described herein improves upon existing approaches, for example, manual or semi-automated questionnaires using user-provided answers (e.g., "number of rooms," "level of messiness") to generate service recommendations and/or pricing, for example, implemented by online cleaning and/or service booking platforms. Another approach is based on using static photos or manual upload systems where users upload images or describe their home, and the system estimates cleaning time or cost based on templates or rules. Yet another approach is based on dynamic pricing based only on time or location Prices are adjusted according to region, day, or duration. At least one embodiment automatically analyzes a user's property (e.g., home environment) from a video, estimates the duration of multiple tasks, and generates a personalized service offer in real time, which is an improvement over using static images, questionnaires, and/or manual assessments. Existing solutions rely on manual input from users or pre-set service packages, which cannot dynamically adapt to the unique layout, cleanliness level, and specific needs of each home. At least one embodiment converts raw video data into actionable insights and linking them to a dynamic pricing engine, creating an end-to-end automated workflow.

In at least one embodiment, the combination, of video aggregation, structured metadata, and/or actionable features, may enable precise and/or scalable prediction of cleaning tasks and/or durations, which cannot be reliably achieved from single-frame analysis.

Examples of improvements and/or potential advantages by at least one embodiment over existing approaches include:

- Automated Video Analysis vs. Manual Questionnaires: In an existing approach, users manually answer questions about their home (number of rooms, size, cleaning needs). Improvement by at least one embodiment: Automatic analyses of video footage of the property, detecting room types, surface areas, clutter, and/or cleanliness levels. At least one embodiment potentially reduces user effort, eliminates human error, and/or provides a more accurate, personalized service assessment.
- Dynamic Task Duration Estimation vs. Predefined Templates: In another existing approach, fixed templates are used for estimating cleaning time (e.g., "2-bedroom apartment=2 hours"). Improvement by at least one embodiment: Calculating the estimated time for each task dynamically, based on visual input and task complexity. At least one embodiment potentially ensures that service offers are accurate for every unique property layout and condition, rather than relying on generalized assumptions.
- Integrated Dynamic Pricing vs. Static or Location-Based Pricing: In yet another existing approach, service prices are adjusted only by location, day, or pre-set rates. Improvement by at least one embodiment: Integration of real-time task duration estimates with a dynamic pricing engine, automatically calculating the most appropriate price for the exact services required. At least one embodiment potentially creates personalized offers that optimize operational efficiency and appeal to customers, which static pricing cannot achieve.
- End-to-End Automation vs. Manual or Semi-Automated Processes: In yet another existing approach, human staff review submitted images or videos to generate quotes. Improvement by at least one embodiment: Fully automatic process: from analyzing the home video to generating a personalized service advertisement with pricing. At least one embodiment potentially drastically reduces labor costs, scales easily, and/or enables instant service offer generation—capabilities that manual or semi-automated approaches cannot match.
- Smart Home Cleaning Robots: This existing approach uses onboard sensors and cameras to map environments and automatically clean them. Their primary goal is to execute cleaning, not to analyze or generate service offers. At least one embodiment uses video input from the user's smartphone, not robot sensors. The analysis by at least one embodiment is cloud-based and geared toward estimating human-performed cleaning effort and generating dynamic service offers—not automating cleaning. At least one embodiment connects perception→estimation→personalized pricing, which no robot does.
- Property Visual Inspection Tools: Such existing platforms use videos or 3D scans to visualize real estate interiors for presentation or documentation. They focus on visualization, and do not perform task estimation or service recommendation. At least one embodiment performs semantic analysis of rooms and surfaces to infer cleaning tasks, required time, and cleanliness levels—then dynamically generates personalized cleaning service offers. At least one embodiment turns visual input into operational data and pricing, not marketing visuals.
- On-Demand Cleaning Marketplaces: These apps allow users to manually select cleaning services, duration, and date. Pricing is fixed or manually adjustable. At least one embodiment automatically determines what services are needed and for how long, based on AI video analysis and dynamic pricing algorithms. At least one embodiment eliminates manual selection and ensures that pricing matches real effort and conditions.
- Computer Vision Cleanliness Detection Research (Academic Works & Open Datasets): Research systems may detect dirt, clutter, or surface types using CNNs or segmentation models—but they stop at classification or scoring. At least one embodiment uses cleanliness detection as an intermediate step feeding into a task-duration estimator and pricing engine. At least one embodiment closes the loop by turning perception data into commercial service offers, enabling full automation of service generation.

At least one embodiment differs from existing systems, for example in:

- Unlike robotic cleaning systems that use onboard sensors for simultaneous localization and mapping (SLAM) during autonomous cleaning execution, at least one embodiment processes user-captured video from commodity mobile device cameras to estimate human-performed cleaning effort, without requiring specialized sensors or robotic hardware.
- Unlike property visualization tools that generate 3D models or virtual tours for real estate marketing purposes, at least one embodiment performs semantic analysis to extract actionable cleaning-related features (object counts, surface areas, cleanliness levels) and transforms these features into task predictions and service pricing.
- Unlike manual questionnaire-based systems that rely on user-provided subjective assessments, at least one embodiment automatically extracts objective features from video through computer vision and machine learning, eliminating user burden and human error in assessment.

Unlike template-based pricing systems that apply fixed time estimates based on property type (e.g., "2-bedroom apartment=2 hours"), at least one embodiment dynamically predicts task-specific durations based on actual visual analysis of the specific property condition, layout, and clutter level.

At least one embodiment provides an exemplary pipeline architecture for implementing an end-to-end automated workflow, which is different than existing approaches, including: video→frame-level feature extraction→structured frame-level metadata→clustering by room→temporal aggregation→structured room-level metadata→ML-based task and duration prediction→dynamic pricing→personalized service offer generation.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
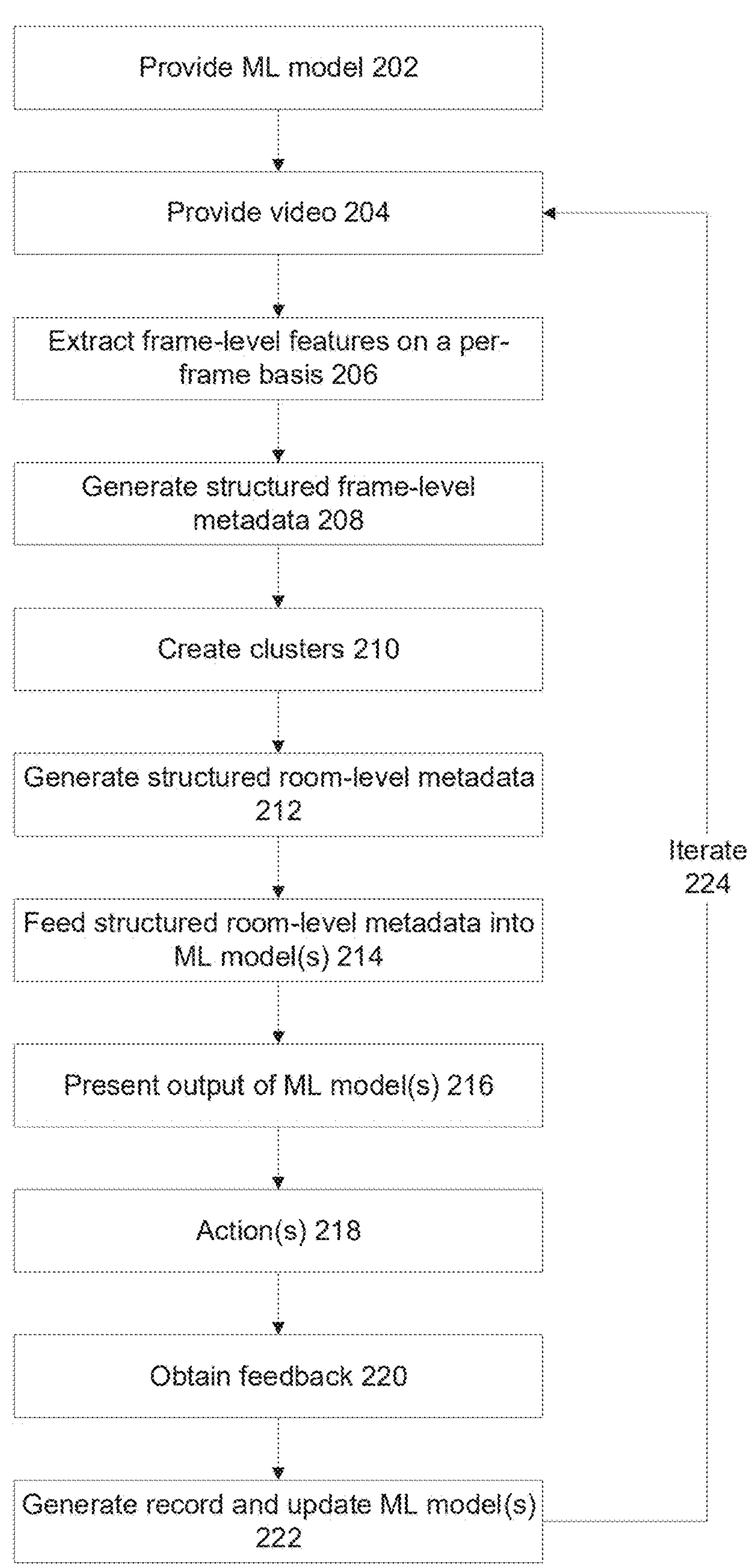
FIG. 2 is a flowchart of a method of processing a video for predicting personalized services for cleaning a property, in accordance with some embodiments of the present invention.
Figure 3:
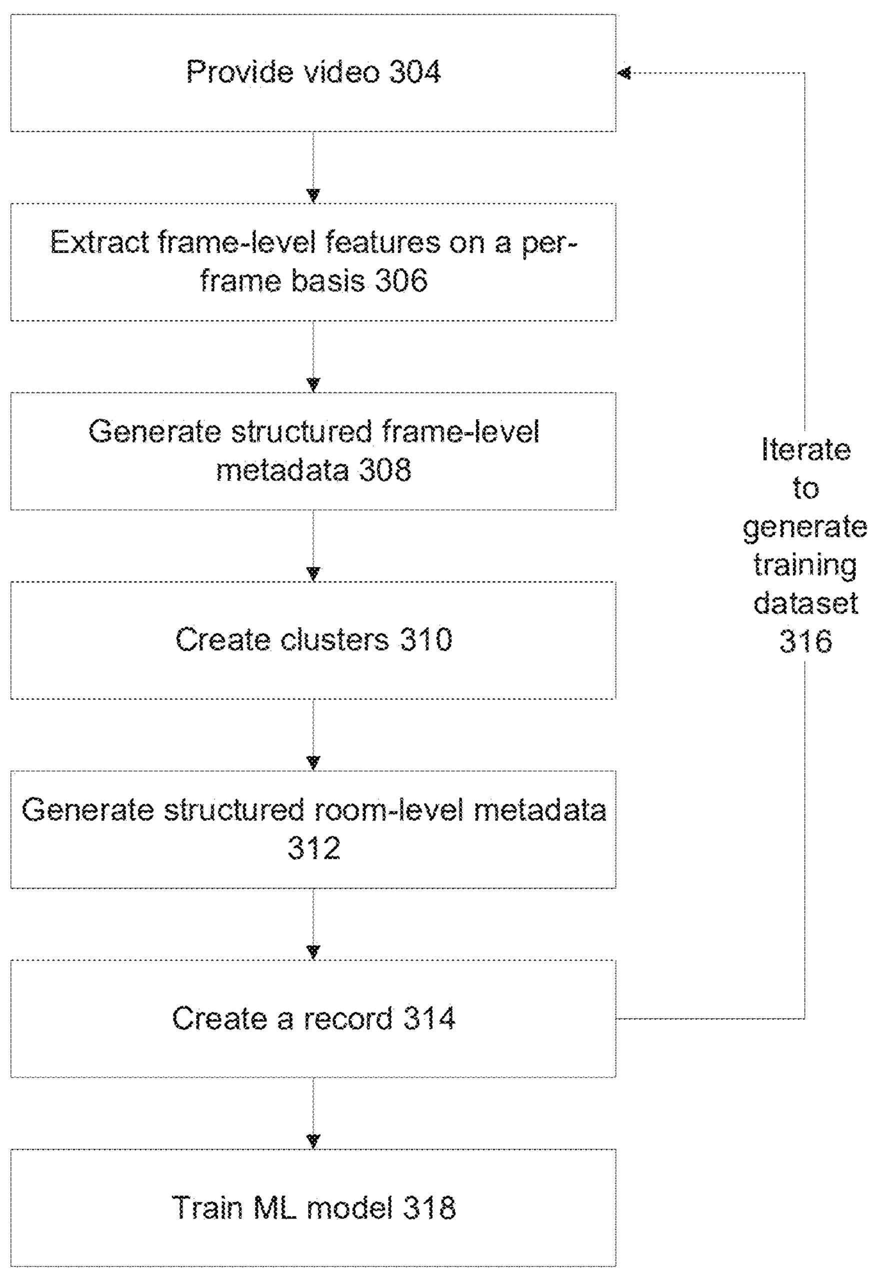
FIG. 3 is a flowchart of a method for training a ML model for predicting personalized services for cleaning a property, in accordance with some embodiments of the present invention.
Figure 4:
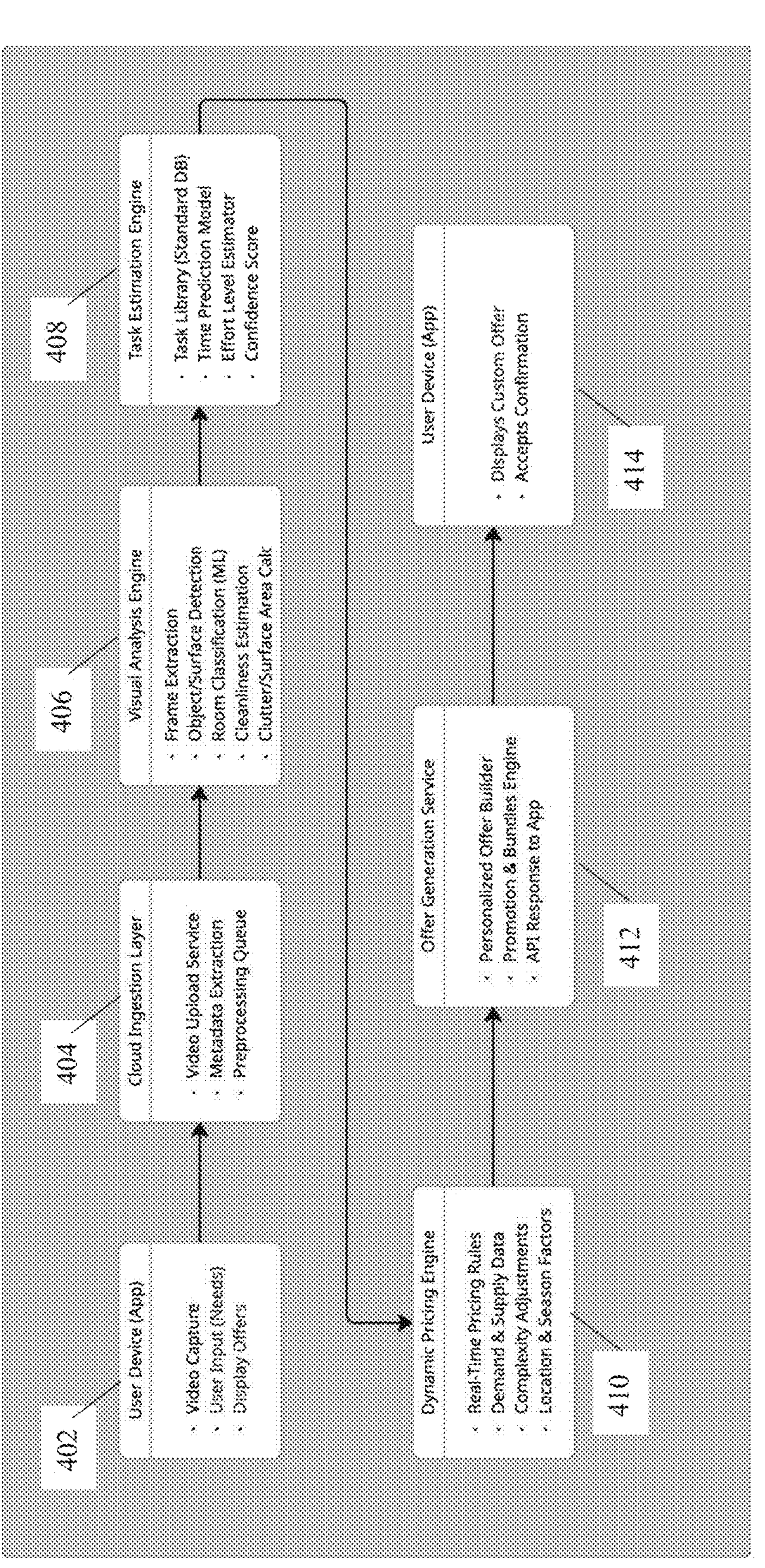
FIG. 4 is a dataflow diagram depicting an exemplary dataflow for processing a video for predicting personalized services for cleaning a property, in accordance with some embodiments of the present invention.

Reference is now made to FIG. 1, which is a block diagram of components of a system 100 for using a ML model and/or for training the ML model for processing a video for predicting personalized services for cleaning a property, in accordance with some embodiments of the present invention. Reference is also made to FIG. 2, which is a flowchart of a method of processing a video for predicting personalized services for cleaning a property, in accordance with some embodiments of the present invention. Reference is also made to FIG. 3, which is a flowchart of a method for training a ML model for predicting personalized services for cleaning a property, in accordance with some embodiments of the present invention. Reference is also made to FIG. 4, which is a dataflow diagram 400 depicting an exemplary dataflow for processing a video for predicting personalized services for cleaning a property, in accordance with some embodiments of the present invention.

System 100 may implement the features of the method(s) described herein, by one or more hardware processors 102 of a computing environment 104 executing code instructions stored in a memory (also referred to as a program store) 106.

Computing environment 104 may be implemented as, for example, a client terminal, a server, a virtual machine, a virtual server, a computing cloud, a mobile device, a desktop computer, a thin client, a Smartphone, a Tablet computer, a laptop computer, a wearable computer, glasses computer, and a watch computer.

Computing environment 104 may receive a video 150 of an interior of a property that includes one or more rooms captured by a camera 112. Camera may be in communication with (e.g., integrated with and/or externally to) a client terminal 108, for example, a mobile device, a smartphone, a tablet, a glasses computer, a laptop, a desktop, and the like. Computing environment 104 generates structured room-level metadata for each room depicted in video 150, and feeds each structured room-level metadata into one or more ML model(s) 120A, as described herein. ML model(s) 120A may be trained on a training dataset(s) 120B, as described herein.

Multiple architectures of system 100 based on computing environment 104 may be implemented.

In an exemplary centralized implementation, computing environment 104 storing code 106A may be implemented as one or more servers (e.g., network server, web server, a computing cloud, a virtual server) that provides services (e.g., one or more of the features of the method(s) described herein) to one or more servers 118 and/or client terminals 108 over a network 110, for example, providing software as a service (SaaS) to the servers 118 and/or client terminal(s) 108, providing software services accessible using a software interface (e.g., application programming interface (API), software development kit (SDK)), providing an application for local download to the servers 118 and/or client terminal (s) 108, and/or providing functions using a remote access session to the servers 118 and/or client terminal(s) 108, such as through a web browser and/or viewing application. For example, users may capture videos 150 of rooms of properties using respective cameras 112 integrated within smartphones (i.e., 108). Client terminals 108 and/or server(s) 118 used by the user may access computing environment 104 to provide the video 150. Computing environment 104 may generate structured room-level metadata for each room of the property depicted in video 150, as described herein. The structured room-level metadata for each room may be fed into a ML model 120A that predicts at least one cleaning task and optionally a corresponding duration for completing each cleaning task. The cleaning task(s) and optionally the corresponding duration may be provided, for example, for generation and/or presentation on a display of client terminal 108 and/or server 118, optionally within a graphical user interface (GUI).

In an exemplary localized implementation, computing environment 104 may represent a local device in communication with camera 112, which is running code 106A and/or ML model 120A. For example, computing environment 104 may be implemented as a smartphone or other mobile device with a built-in camera 112. A user may use the camera 112 of the smartphone to capture video 150 of an interior of a property (e.g., their apartment). Video 150 may be locally processed to generate structured room-level metadata as described herein using code 106A locally running on the smartphone. The structured room-level metadata may be fed into ML model(s) 120A running on the smartphone that predicts at least one cleaning task and optional corresponding estimated durations. The predicted cleaning task(s) and optional corresponding estimated durations may be presented on a display of the smartphone, optionally within a GUI. The smartphone may communicate with a server 118 to order a cleaning service to perform the predicted cleaning task(s) at the optional estimated durations.

ML model 120A may be trained on a training dataset(s) 120B. Training may be centrally performed, such as by a server, using videos captured from different sample properties. Once trained, ML model(s) 120A may be provided to different servers that provides services to client terminals, and/or ML model(s) 120 may be provided to remotely located client terminals 108, for example, for download for running on the local client terminal (e.g., smartphone).

Exemplary ML architectures of ML models 120A described herein include, for example, a detector architecture, a classifier architecture, and/or a pipeline combination of detector(s) and/or classifier(s), statistical classifiers and/or other statistical models, neural networks of various architectures (e.g., convolutional, fully connected, deep, encoder-decoder, recurrent, transformer, graph), support vector machines (SVM), logistic regression, k-nearest neighbor, decision trees, boosting, random forest, a regressor, and/or any other commercial or open source package allowing regression, classification, dimensional reduction, supervised, unsupervised, semi-supervised, and/or reinforcement learning. Machine learning models may be trained using supervised approaches and/or unsupervised approaches.

Camera(s) 112 may be implemented, for example, as a standard visible light camera (e.g., CCD, CMOS sensors, and/or red green blue (RGB) sensor).

Camera(s) 112 may be integrated within client terminal 108 and/or computing environment 104 and/or server(s), for example, built into a smartphone. Alternatively or additionally, camera(s) 112 may be implemented as a standalone device in communication with client terminal 108 and/or computing environment 104.

Camera(s) 112 may transmit captured videos 150 to computing environment 104 and/or client terminal 108 and/or server(s) 118, for example, via a direct connection such as via data interface 122 (e.g., local bus and/or cable connection and/or short range wireless connection), and/or via a network 110 accessed by data interface 122 (implemented as a network interface) of computing environment 104 and/or client terminal(s) 108 and/or server(s) 118 (e.g., where cameras are connected via internet of things (IoT) technology and/or are located remotely from the computing environment).

Network interface 122 may be implemented as, for example, a wire connection (e.g., physical port), a wireless connection (e.g., antenna), a network interface card, a wireless interface to connect to a wireless network, a physical interface for connecting to a cable for network connectivity, and/or virtual interfaces (e.g., software interface, application programming interface (API), software development kit (SDK), virtual network connection, a virtual interface implemented in software, network communication software providing higher layers of network connectivity).

Memory 106 stores code instructions executable by hardware processor(s) 102. Exemplary implementations of memory 106 include a random access memory (RAM), read-only memory (ROM), a storage device, non-volatile memory, magnetic media, semiconductor memory devices, hard drive, removable storage, and optical media (e.g., DVD, CD-ROM). For example, memory 106 may code 106A that execute one or more acts of the method(s) described herein.

Computing environment 104 may include data storage device 120 for storing data, for example, ML model(s) 120A (as described herein), training dataset(s) 120B for training the ML model(s) 120A, metadata repository 120C (e.g., relational database) set for storing the structured frame-level and/or room-level metadata described herein, and/or other code performing other features and/or storing other data as described herein. Data storage device 120 may be implemented as, for example, a memory, a local hard-drive, a removable storage unit, an optical disk, a storage device, a virtual memory and/or as a remote server 118 and/or computing cloud storage (e.g., accessed over network 110).

Computing environment 104 and/or client terminal(s) 108 and/or server(s) 118 include and/or are in communication with one or more physical user interfaces 124 that include a mechanism for inputting data and/or for viewing data, for example, a display for presenting a GUI used for providing a captured video 150 and/or for presenting the predicted cleaning task(s). Exemplary user interfaces 124 include, for example, one or more of, a touchscreen, a display, a keyboard, a mouse, and voice activated software using speakers and microphone.

Computing environment 104 may serve as a backend designed for handling uploads of videos, pre-processing, and/or AI inference by one or more ML model(s) described herein. Computing environment 104 may implemented, for example, as a Python and/or Node.js server.

Computing environment 104 may be designed for scalability based on a microservice architecture for implementing one or more of: video processing, analysis, pricing, cleaning service offer generation, and the like.

Referring now back to FIG. 2, at 202, a ML model is provided (e.g., accessed and/or trained). An exemplary approach for training the ML model is described with reference to FIG. 3.

At 204, a video depicting an interior of a property of one or more rooms is provided, for example, accessed and/or received. For example, a user may upload the video to a server and/or cloud based service via their mobile device. In another example, the video may be analyzed by an app running on the mobile device.

"Property" refers to a physical space comprising one or more rooms, including but not limited to: residential properties (houses, apartments, condominiums), commercial properties (offices, retail spaces), hospitality properties (hotels, guest houses), and institutional properties (schools, hospitals).

The video may be captured by a camera. The camera may be integrated with and/or connected to a mobile device.

The video depicts different views of each room of the property. For example, the user is instructed (e.g., via an app installed on their mobile device and/or via a GUI presented on a display of the mobile device) to walk around the property, from room to room, for capturing the room at different camera poses (e.g., orientations and/or locations). Optionally, instructions may be dynamically presented within the GUI for dynamically guiding the user on how to capture the video. For example, the video undergo an initial analysis to determine whether the video meets minimal parameters to obtain a sufficiently accurate prediction of the cleaning task. The minimal parameters may include, for example, a threshold indicating minimal confidence of extracted features, minimum quality level of the video, minimal number of frames captured, minimal number of poses of the camera, and the like. The initial analysis may be performed by an app running on the mobile device, and/or by the server. The GUI may be dynamically updated for example, to zoom in on specific areas, capture missing angles, and/or provide 180° or 360° coverage of a room. Such closed-loop interaction may improves video quality and/or confidence of the ML model.

As used herein, the term camera pose may refer to the six-degree-of-freedom (6-DOF) position and/or orientation of the camera in three-dimensional (3D) space, include: three translational parameters (x, y, z coordinates) and/or three rotational parameters (roll, pitch, yaw angles, and/or equivalent representations such as quaternions or rotation matrices). Different camera poses provide different viewpoints of the same room, enabling capture of surfaces and objects that may be occluded or outside the field of view in other poses.

The multiple views of the same room captured from different camera poses may improve accuracy of computation of the structured room-level metadata for the room. For example, accuracy of surface coverage estimation may improve as different camera angles expose, for example, previously hidden portions of floors, counters, tables, beds, items in sink, and/or other surfaces that are rarely fully visible in a single image.

The video may be recorded via a code process that operates the camera and/or controls the record of the video, for example, an app running on a mobile device, via a web interface connected to a server, and the like. The code process may help ensure that the video conforms to a defined format, for example, meets a minimum quality level, has a defined frame rate, checks that the camera is positioned within a defined orientation range, and the like.

The frames of the video may be pre-processed for normalizing resolution and/or lighting conditions.

The video may exclude labels and/or audio, i.e., no indication of each room is necessary explicitly provided in the video.

The videos may be uploaded and stored in a cloud storage.

At 206, frame-level features are extracted from frames of the video on a per-frame basis. Features are extracted for each individual frame, according to an analysis of that individual frame.

"Frame-level features" may refer to visual characteristics extracted from a single frame of video, including but not limited to: detected objects with bounding boxes and classification labels, detected surfaces with segmentation masks and classification labels, spatial relationships between objects and surfaces, color distributions, texture patterns, and inferred room type.

The frame-level feature extracted from each frame may include low-level visual features, for example, detected objects, surfaces, number of items to clean, room type, and the like.

The individual frames that are analyzed may include, for example, each one of the frames in the video, sampling of frames (e.g., every Nth frame, one frame per second, and the like), in response to detecting a significant shift in camera pose, and the like.

Optionally, the frame-level features are extracted for a frame by feeding the frame into a room classification model trained to generate a classification category indicating type of room. Examples of the room type include: living room, kitchen, bedroom, bathroom, hallway, and office. Alternatively or additionally, a process (or the room classification model itself) keeps track of the room classification categories generated by the room classification model, for differentiating between two different rooms of the same type. In such implementations, each type of room may be further assigned a number or other label to differentiate it from another room of the same type. For example, in a 2 bedroom apartment, the categories may be bedroom-1 and bedroom-2.

Alternatively or additionally, the frame-level features are extracted for the frame by feeding the frame into one or more detector models trained for detecting at least one object in the frame. Optionally, objects may include movable items which may be re-arranged, for example, clothing, pots, backpacks, bed covers, towels, pillow, movable lights, and the like. Alternatively or additionally, objects may include fixed items which cannot be easily re-arranged and/or which are not usually significantly moved during cleaning, for example, light fixtures, dining room table, sofa, dresser, mirror, and the like.

Alternatively or additionally, the detector model(s) is trained for detecting at least one surface depicted in the frame. The detector may detect multiple surfaces of different types, and assign classification labels to each detector surface. Surfaces represents regions which may be cleaned by at least one cleaning task predicted herein. Examples of surfaces and corresponding classification labels include: floor, tables, beds, and counters. Optionally, the surfaces are of the detected fixed objects.

The same detector model may be used to detect objects and surfaces. Alternatively, different detector models are used for objects and for surfaces. Alternatively, an ensemble of detector models is implemented, where each detector model is trained to detect a specific object and/or specific surface.

The detector model(s) may be implemented as, for example, a semantic segmentation model generating multiple classifications for pixels of the frame, and/or as a detector that generates labelled bounding boxes overlaid on the input image, each bounding box delineating a certain object and/or surface.

Optionally, one or more spatial relationships are computed between the objects and/or surfaces. The frame-level features may be computed according to the spatial relationships between the different types of surfaces and/or objects. For example, floor distance between a table and sofa, length and width of a surface of a table, and the like. The spatial relationships may be computed using direct 2D measurements for the frame and/or estimating distances by considering camera pose. A more accurate estimate may be computed by aggregation of the feature from multiple frames captured at different camera poses, as described herein.

At 208, structured frame-level metadata is generated from the frame-level features on the per-frame basis.

"Structured frame-level metadata" may refer to frame-level features organized in a predefined data structure enabling efficient processing, such as a feature vector, key-value pairs, or database record.

The structured frame-level metadata may include the following per frame, for example: room ID (e.g., indicating room type classification category), object location(s), and/or cleanliness score.

The structured frame-level metadata may be generated by one or more of:

- Populating a predefined data structure template with the extracted and computed features. The data structure may be formatted, for example, as a JSON object, a relational database record with defined fields and data types, and/or a fixed-length numerical feature vector. For example, a frame depicting a kitchen may generate structured frame-level metadata including: room type "kitchen" with confidence 0.94, object counts {plate: 2, cup: 2, pot: 1}, surface coverage {counter: 0.217, floor: 0.204}, and a computed frame-level cleanliness score of 5.0 on a 0-10 scale based on object density and clutter indicators.
- Parsing detector model outputs to extract bounding box coordinates, class labels, and confidence scores for each detection.
- Normalizing bounding box coordinates to a standardized format (e.g., converting pixel coordinates to normalized coordinates ranging from 0.0 to 1.0 based on frame dimensions).
- Filtering detections below a confidence threshold and applying non-maximum suppression (NMS) with an intersection-over-union (IoU) threshold to remove duplicate detections.
- Aggregating object counts by class (e.g., counting total plates, cups, utensils detected in the frame).
- Computing surface coverage ratios by determining the percentage of frame pixels classified as each surface type.
- Computing spatial relationships including object-to-surface relationships by calculating overlap ratios between object bounding boxes and surface segmentation masks, and object-to-object proximities by calculating centroid distances.

An example of structured frame-level metadata for a frame captured in a kitchen may be as follows:

```
{
  "frame_id": 157,
  "timestamp": 5.23,
  "room_type": "kitchen",
  "room_type_confidence": 0.94,
  "detected_objects": [
    {"type": "plate", "count": 3, "bounding_box": [120, 340, 185, 390], "confidence": 0.89},
    {"type": "cup", "count": 2, "bounding_box": [200, 350, 245, 410], "confidence": 0.92},
    {"type": "pot", "count": 1, "bounding_box": [50, 300, 150, 380], "confidence": 0.87}
  ],
  "detected_surfaces": [
    {"type": "counter", "pixel_area": 45000, "coverage_ratio": 0.35, "confidence": 0.91},
    {"type": "floor", "pixel_area": 120000, "coverage_ratio": 0.65, "confidence": 0.88}
  ],
  "estimated_clutter_score": 6.2,
  "lighting_quality": "good",
  "blur_score": 0.15
}
```

At 210, multiple clusters may be created, where each cluster corresponds to a different room (i.e., different type of room) of the property. Each cluster includes the structured frame-level metadata corresponding to the specific room associated with the cluster.

The clustering may be performed using different approaches, for example one or combination of the following:

By clustering the structured frame-level metadata.

According to the type of room generated by the classification model. Clusters may be created by a clustering model based on a supervised approach using the classification category indicating type of room serving as a ground truth.

Clustering the frames themselves. The clusters of frames may be created using another clustering model based on a non-supervised approach. The other clustering model may be trained to create clusters of frames likely depicting the same room. The structured frame-level metadata associated to each frame may be mapped to the cluster to which the frame belongs to.

The clustering may be implemented, for example, using one or more processes selected from: k-means clustering, hierarchical clustering, DBSCAN (Density-Based Spatial Clustering of Applications with Noise), and/or Gaussian Mixture Models.

In one embodiment employing supervised clustering based on room classification categories, frames assigned the same room type classification are grouped into the same cluster. Temporal continuity may be enforced such that frames are assigned to a new cluster when: the room classification category changes, and the change persists for at least N consecutive frames (e.g., N=3 to 10 frames) to avoid spurious cluster transitions due to misclassification. In another embodiment employing unsupervised clustering, feature vectors are constructed from the structured frame-level metadata (e.g., concatenating object detection counts, surface type distributions, and color histograms), and clustering is performed in this feature space. The optimal number of clusters may be determined using, for example, the elbow method, silhouette analysis, and/or by constraining the cluster count based on expected room count inferred from property metadata.

At 212, the structured frame-level metadata of the frames of each respective cluster are temporally aggregating to generate a respective structured room-level metadata for each respective room represented by each respective cluster. The structured frame-level metadata may represent a stable and/or consistent room-level representation for the respective room denoted by the corresponding cluster, that is independent of the raw video and/o individual frames.

Temporal aggregation may refer to combining information from multiple frames captured over a time interval to generate a consolidated representation, including operations such as: deduplication of repeated detections, statistical summarization (e.g., mean, median, mode), accumulation of measurements, and temporal filtering.

"Structured room-level metadata" may refer to aggregated features representing characteristics of an entire room, derived from temporal aggregation of structured frame-level metadata from multiple frames depicting the same room.

The structured room-level metadata includes room-level features which cannot be accurately computed from an individual frame (i.e., individual structured frame-level metadata) and/or cannot be computed at all from the individual frame. The aggregation of multiple structured frame-level metadata of the same room enable (more) accurate computation of the structured room-level metadata.

Optionally, multiple detections of the same object(s) across frames are deduplicated. The deduplication may reduce likelihood and/or preventing inflation of object counts. The deduplication may be implemented, for example, using spatial overlap, temporal persistence, and/or confidence scoring. The deduplication process may implement an intersection-over-union (IoU) threshold-based approach. In one embodiment, two object detections across different frames are considered duplicates if: (i) their bounding boxes have an IoU value exceeding a threshold, (ii) they share the same classification label, and (iii) they appear in frames within a temporal window of a predefined time. The confidence scoring may involve retaining the detection with the highest confidence score among duplicates, and/or computing a weighted average of detection parameters (e.g., bounding box coordinates, size) weighted by respective confidence scores. Temporal persistence may be evaluated, for example, by tracking object detections across consecutive frames using, for example, a Kalman filter and/or a tracking algorithm such as SORT (Simple Online and Realtime Tracking) or DeepSORT.

Examples of features which may be included in the structured room-level metadata include:

Detected surface types. For example, kitchen counter, floor, dining room table, and the like.

Object types and/or diversity. Examples of object types include: clothing, dishes, toys, and other examples described herein. The object diversity may be represented as, for example, the number of types of objects. For example, a room with only many clothes to pick up has a lower object diversity than a room with clothes, toys, and dishes to pick up-which represents a higher object diversity. A lower object diversity may indicate a simpler cleaning task than a higher object diversity, for example, since a higher object diversity may require more difficulty in organizing the different types of object such as returning to different places and/or different methods of cleaning (e.g., dishes by washing dishes versus clothing by placing in a washing machine).

Object count. For example, the number of objects of each type.

Estimated surface area. For example, for each different type of surface to be cleaned. For example, floor surface area such as to sweep and/or mop, kitchen counter and/or table top surfaces to de-cluster and/or wipe down, and the like. The estimated surface area may be computed by, for example: detecting surface boundaries such as using semantic segmentation generating pixel-wise classifications, computing pixel area for each detected surface type in each frame, estimating real-world scale such as using one or more reference objects of known dimensions, transforming pixel measurements to metric measurements using the estimated scale and/or camera intrinsic parameters, and aggregating surface area measurements across multiple frames using statistical methods such as median filtering, weighted averaging based on detection confidence, and/or RANSAC (Random Sample Consensus) to reject outlier measurements. In one embodiment, camera motion is estimated using structure-from-motion (SfM) techniques or simultaneous localization and/or mapping (SLAM) to register multiple views and accumulate non-overlapping surface observations.

Object density. For example, estimated number of clothes to pick up off the floor and/or couch for the surface area of the floor and/or couch. In another example, estimated number of plates and utensils to wash and/or organize for the surface area of the table and/or counter.

Measured room size and/or room layout. The measured room size may be computed from the structured room-level metadata generated through temporal aggregation of frame-level features extracted from the video. Room size and/or layout estimation may be approximated, for example, by accumulating segmented surfaces and/or relative object scale across frames, optionally incorporating camera motion. Room size may be estimated by accumulating detected surface areas and/or spatial relationships across multiple frames and viewpoints. Aggregating the structured frame-level metadata of multiple frames may yield significantly more reliable estimates than single-frame inference. An exemplary approach for estimating room size using video-based analysis by aggregating surface detections across multiple frames captured from different angles and distances is now described. The system may identify and/or classify major surfaces such as floors, walls, counters, beds, and/or tables using semantic segmentation and object detection models. By accumulating visible surface areas across frames and normalizing them using relative object scale and/or camera motion, the system may compute an approximate room size and/or usable surface coverage. This multi-frame aggregation approach significantly improves robustness compared to single-image estimation, where large portions of the room are often occluded or outside the field of view.

Cleanliness level. The measured room cleanliness level may be computed from the structured room-level metadata generated through temporal aggregation of frame-level features extracted from the video. The room cleanliness level may be computed as a weighted combination and/or function of multiple features extracted and/or aggregated across video frames, for example, object count, object diversity, object density, object variety, surface exposure and/or obstruction, inferred handling requirement, and/or clutter distribution. The system may analyze the number and/or types of objects detected on floors and/or on cleanable surfaces, optionally including the extent to which those surfaces are covered or obstructed. Examples of features contributing to the cleanliness measure include, for example: the number of items detected in sinks and/or on kitchen counters, the number of objects requiring deep cleaning versus regular cleaning, the number of objects detected on the floor that require picking up, the number of clothing items requiring folding or laundry cleaning, and/or the number of items detected within closets or storage areas that require ordering or organization. Additional indicators include, for example, scattered items, partially obstructed surfaces, unfolded clothing, and/or accumulated dishes. By detecting these features across multiple frames and/or viewpoints in the video, the system may reduces noise, reduce occlusion-related errors, improve partial visibility, and/or may improve confidence of the inferred cleanliness level.

Cleaning difficulty metric. The difficulty metric may indicate the amount of cleaning resources needed to perform the cleaning task and/or the amount of time to perform the cleaning task. The cleaning metric may be represented, for example, as a number on a range (e.g., 0-10), a classification category (e.g., light, medium, difficult), and the like. The difficulty metric may be computed by aggregating frame-level features of the structured frame-level metadata obtained from multiple frames, for example, clutter patterns, surface exposure, and/or object distribution.

Measured room cleanliness. The measured room cleanliness may be computed as a combination of at least one of: number of objects to pick up, variety of different objects in the room, required sorting, required folding.

Actionable indicators tracked by the systems, that may inform downstream cleaning tasks:

- Number of items in the sink or on counters.
- Number of objects requiring deep cleaning versus regular cleaning.
- Number of objects on the floor that need to be picked up.
- Number of clothing items that require folding.
- Number of items in closets or storage areas that require organization or ordering.

It is noted that room cleanliness and cleaning difficulty are related but distinct concepts. Room cleanliness reflects the current level of clutter and/or mess in a room, whereas cleaning difficulty additionally accounts for the types of surfaces present, the actions required to clean them, and/or the complexity of handling objects. For example, two rooms with similar cleanliness scores may differ significantly in cleaning difficulty if one requires folding, sorting, or careful handling of items, and/or involves sensitive surfaces and/or specialized equipment. Cleaning difficulty may incorporate both cleanliness indicators and inferred task complexity.

In some embodiments, one or more of the aforementioned data elements which may be included in the structured room-level metadata may be computed using heuristic rules, such as threshold-based aggregation of object counts and/or predefined mappings from detected surfaces to cleaning actions. In other embodiments, one or more ML models are trained to predict cleanliness and/or task difficulty from the structured frame-level metadata, optionally refined over time using feedback as described herein.

An example of structured room-level metadata generated by aggregating structured frame-level metadata from 47 frames of a kitchen, is as follows:

```
{
  "room_id": "kitchen_1",
  "room_type": "kitchen",
  "frame_count": 47,
  "object_summary": {
    "plate": {"count": 8, "confidence": 0.91},
    "cup": {"count": 5, "confidence": 0.89},
    "pot": {"count": 2, "confidence": 0.88},
    "utensil": {"count": 12, "confidence": 0.85}
  },
  "object_diversity": 4,
  "total_object_count": 27,
  "surface_summary": {
    "counter": {"area_sqm": 2.3, "confidence": 0.92},
    "floor": {"area_sqm": 8.7, "confidence": 0.90},
    "sink": {"area_sqm": 0.4, "confidence": 0.87}
  },
  "total_surface_area_sqm": 11.4,
  "object_density_per_sqm": 2.37,
  "estimated_room_size_sqm": 12.1,
  "cleanliness_score": 4.2,
  "cleaning_difficulty_score": 6.5,
  "clutter_distribution": "concentrated_on_counter"
}
```

The simple representation (e.g., text based) of the structured room-level metadata, such as the example above, improves performance of a computing training and/or performing inference by the ML model. Processing the text based structured room-level metadata requires significantly less processor utilization, processing time, less memory and/or data storage, in comparison to training a model and/or performing inference by the model using videos. Videos, which include a large number of pixels, require significant processor utilization, processing time, memory and/or data storage to train and/or perform inference by the model.

At 214, each structured room-level metadata is into at least one ML model. The model generates a prediction of at least one cleaning task for cleaning the room corresponding to the structured room-level metadata.

"Cleaning task" may refer to a specific cleaning activity to be performed in a room, such as sweeping, mopping, dishwashing, decluttering, dusting, vacuuming, or organizing.

The ML model may further generate a prediction of one or more of the following for the room, for example:

- Estimated duration for completing each cleaning task. For example, in minutes and/or hours, optionally using a defined amount of work resources (e.g., number of cleaning staff).
- Predicted cleaning devices and/or cleanghgging detergents to complete the cleaning task. For example, broom, mop, rag, cleaning detergent for floors, cleaning spray for windows, rolls of paper towels, and/or scraper (e.g., to scrap stuck tape, gum, and the like).

The ML model may generate the prediction by performing forward propagation through the network layers and applying activation functions to produce output values.

Alternatively or additionally, for each respective room, features of the structured room-level metadata of the respective room may be mapped to one or more cleanings tasks. Multiple cleaning tasks may be identified for the multiple rooms. The mapped cleaning task and the structured room-level metadata may be fed into the ML model (or another ML model) trained for predicting a duration for completing of each cleaning task.

Optionally, the predicted cleaning task(s), corresponding estimated durations, and optionally at least one current parameter, and/or other data (e.g., complexity metrics indicating complexity of each cleaning task) are fed into a pricing engine. The pricing engine is designed for dynamically computing costs for performing each of the predicted cleaning task and/or computing a price for performing all of the selected sub-set of cleaning tasks (without necessarily providing a break-down per task) such as in a single visit. The pricing engine may be implemented as, for example, a rules engine, ML-based regression model, and the like. The current parameter(s) enable adjusting the price to real-time conditions. The current parameter(s) may be obtained, for example, by querying an application programming interface (API) of a server that provides current data, monitoring a live-data stream feed, accessing a location in memory which stores provided current values, and the like. Examples of current parameters include: base labor cost, regional adjustment, supply-demand factor, and discount as part of a promotion.

The ML model for predicting cleaning tasks and/or durations may be implemented, for example, as one or more (e.g., combination) of the following architectures:

- A multi-task neural network comprising: an input layer receiving the structured room-level metadata as a feature vector of dimension D, one or more hidden layers (e.g., 2 to 5 fully connected layers with 128 to 512 neurons per layer) with activation functions such as ReLU (Rectified Linear Unit) or ELU (Exponential Linear Unit), a first output branch for classification of cleaning tasks using a softmax activation function over C task classes, and a second output branch for regression of task duration using a linear or ReLU activation function.
- An ensemble model including multiple base learners such as: a gradient boosting machine (e.g., XGBoost, LightGBM, CatBoost) for duration prediction, a random forest classifier for task classification, and a neural network for learning complex non-linear relationships, wherein final predictions are generated by weighted voting or averaging of base learner outputs.
- A sequence model such as an LSTM (Long Short-Term Memory) or GRU (Gated Recurrent Unit) network that processes the structured room-level metadata as a sequence, enabling modeling of dependencies between different rooms in the property.

The ML model may be trained using a loss function that is a weighted combination of, for example: a classification loss (e.g., cross-entropy loss) for task prediction, and a regression loss (e.g., mean squared error, mean absolute error, or Huber loss) for duration prediction. The weights may be tuned using hyperparameter optimization techniques such as grid search, random search, or Bayesian optimization.

An example of a prediction generated by the ML model in response to an input of the structured room-level metadata for kitchen_1, is as follows:

```
{
  "room_id": "kitchen_1",
  "predicted_tasks": [
    {
      "task": "dishwashing",
      "confidence": 0.93,
      "estimated_duration_minutes": 18,
      "duration_confidence_interval": [15, 22],
      "required_equipment": ["dish_soap", "sponge", "drying_rack"],
      "complexity": "medium"
    },
    {
      "task": "counter_decluttering",
      "confidence": 0.89,
      "estimated_duration_minutes": 12,
      "duration_confidence_interval": [10, 15],
      "required_equipment": ["storage_containers", "cleaning_spray"],
      "complexity": "low"
    },
    {
      "task": "floor_sweeping",
      "confidence": 0.95,
      "estimated_duration_minutes": 8,
      "duration_confidence_interval": [6, 10],
      "required_equipment": ["broom", "dustpan"],
      "complexity": "low"
    },
    {
      "task": "floor_mopping",
      "confidence": 0.91,
      "estimated_duration_minutes": 15,
      "duration_confidence_interval": [12, 18],
      "required_equipment": ["mop", "floor_cleaner", "bucket"],
      "complexity": "medium"
    }
  ],
  "total_estimated_duration_minutes": 53,
  "total_confidence": 0.92
}
```

At 216, an indication of the cleaning task(s) and optionally other associated data predicted by the ML model such as estimated durations for completion of each cleaning task and/or computed costs, is provided.

Optionally, the cleaning task(s) and optionally the other associated data and/or computed costs are provided for presentation on a display of a client terminal, optionally within a GUI.

Optionally, a personalized advertisement is generated. The personalized advertisement may be formatted for presentation on a mobile device by a user app interface.

The personalized advertisement may include one or more of:

- List of predicted cleaning tasks to be performed.
- Estimated duration for completion of each task, and/or estimated duration for completion of all tasks.
- Price per task, and/or price for all tasks.
- Call-to-action for booking.

At 218, one or more actions may be triggered in response to an interaction by a user with one or more interactive elements of the GUI.

The interactive elements may be designed to enable a user to select a subset of the presented cleaning tasks (the subset may include all of the cleaning tasks). Examples of interactive elements include: a clickable button, a clickable link, a checkable box, and a speech controlled selection mechanism.

Optionally, a cleaning service for performing the selected subset of the cleaning tasks may be automatically ordered in response to the interaction with the interactive element. The automatic ordering may be done, for example, by the client terminal presenting the GUI generating a message in response to interaction with the interactive element presented in the GUI, sending the message to a scheduling server that dynamically allocates cleaning resources (e.g., human cleaners, equipment) to different ordered cleaning services, and that automatically schedules the cleaning service for performing the selected subset of cleaning tasks.

At 220, feedback regarding the cleaning service may be obtained after the cleaning service has been completed. Feedback may be entered by the user regarding the cleaning task, for example, actual duration to complete one or more of the cleaning task, accuracy and/or quality of performance of the cleaning task (e.g., cleaned properly, missed a spot, etc. . . . ), customer satisfaction (e.g., satisfied, not satisfied, etc. . . . ), feedback regarding price (e.g., too high, just right, got a deal), and the like. The feedback may be entered by a user via one or more interactive elements presented in the GUI designed for the user to enter feedback, for example, selecting numbers on an evaluation scale, manually entering text into a text box, pressing on emoticons (e.g., happy, sad, neutral), and the like.

At 222, a record may be dynamically generated based on user feedback regarding the selected subset of cleaning tasks that were ordered by the user. The record may include the structured room-level metadata for each of the rooms, corresponding cleaning task(s) predicted for each room by the ML, and/or other data. The record may further include the feedback regarding the cleaning service.

The ML model may be updated based on the record, for improving accuracy of the future predictions made by the ML model. The future predictions may be improved by evaluating the actual outcomes based on the user feedback. For example, where the actual time to perform a certain cleaning tasks is significantly higher than predicted, the ML model may learn to adjust its predictions to reflect the actual time.

At 224, one or more features described with reference to 202-222 may be iterated. For example, each iteration may be for ordering a cleaning service session, for the same property and/or for different properties. The iterations may dynamically update the ML model based on feedback.

Referring now back to FIG. 3, at 304, a sample video is received. The sample video may be one of multiple different sample videos. The sample videos may be selected according to a selected implementation of the ML model. For example, a generic ML model may be generated, that is trained on sample videos of different types of properties with different types of rooms. Such generic ML model may be trained on sample videos of apartments, homes, offices, stores, hotels, and the like. The properties may be in different geographical locations, representing different architectural designs. Alternatively, a specialized ML model may be generated. The specialized ML model may be trained on sample videos of specific types of properties and/or in specific geographical locations representing common architectural designs. For example, the specialized ML model may be trained on sample videos of apartments in Manhattan. In another example, the specialized ML model may be trained on office spaces.

Exemplary samples videos are described, for example, with respect to the video discussed in 204 of FIG. 2.

At 306, frame-level features are extracted from frames of the sample video on a per-frame basis, for example, as described with reference to 206 of FIG. 2.

At 308, structured frame-level metadata is generated from the frame-level features on the per-frame basis, for example, as described with reference to 208 of FIG. 2.

At 310, clusters corresponding to the different types of rooms depicted in the video are created, for example, by clustering the frames. The structured frame-level metadata of the frames is assigned to the different clusters. Alternatively, the clusters may be created by clustering the structured frame-level metadata of the frames into multiple clusters, each cluster corresponding to a different room depicted in the video. Additional details of clustering are described, for example, with reference to 210 of FIG. 2.

At 312, the structured frame-level metadata of the frames of each cluster corresponding to each type of room are temporally aggregated to generate the sample structured room-level metadata for each room represented by each cluster, for example, as described with reference to 212 of FIG. 2.

At 314, a record is created. The record includes at least a sample structured room-metadata, and at least one sample cleaning task performed for cleaning the specific room corresponding to the sample structured room-metadata. For supervised training, the sample cleaning task(s) may be labelled as ground truth. The record may include additional data, optionally as ground truth, for example, corresponding duration for completing each sample cleaning task, equipment used to complete the sample cleaning task, amount and/or type of cleaning products used to complete each sample cleaning task, and the like.

It is noted that multiple records may be created from each video. Each record may correspond to a different room depicted in the video.

At 316, one or more features described with reference to 302-314 may be iterated to create a training dataset of multiple records. In each iteration a different sample video may be used.

At 318, the ML model is trained on the training dataset. The ML model may be trained for predicting at least one target cleaning task and optional additional data such as a corresponding target duration for completing each target cleaning task. The prediction is generated in response to an input of a target structured cluster-level metadata computed from a target video as described herein.

Referring now back to FIG. 4, the dataflow diagram described with reference to FIG. 4 may be implemented by components of system 100 described with reference to FIG. 1, and/or based on and/or combined and/or used to implement and/or be implemented by features of the methods described with reference to FIGS. 2 and/or 3.

At 402, a user device (e.g., running an app) performs a capture of a video. The app may be designed to display cleaning service offers, optionally within a GUI, generated as described herein.

At 404, a cloud ingestion layer may provide a video upload service for enabling users to upload videos of their properties. The cloud ingestion layer may perform feature extraction and/or structured metadata generation, as described herein. The cloud ingestion layer may provide a pre-processing queue.

At 406, a visual analysis may process the video and implement one or more of the following features: frame extraction from the video, detect object and/or surfaces in frames, perform inference by a room classification ML model, estimation cleanliness, and/or compute cluster and/or surface area.

At 408, a (cleaning) task estimation engine may implement one or more of the following features: manage a task library (e.g., implemented in a database), inference a time prediction ML model generating a predicted amount of time to complete each task, inference by an effort level estimation model that predicts complexity and/or effort for completing each task, and generating a confidence score.

At 410, a dynamic pricing engine may implement one or more of the following features: generating a real-time price for each or all of the cleaning tasks, consider demand and/or supply data, perform adjustments of price based on predicted complexity of completing the tasks, and/or take into account location and/or season factors.

At 412, an offer generation service may implement one or more of the following feature: build a personalized offer for the user according to the video, run a promotion and/or bundles engine that automatically generates personalized promotions and/or bundles, and/or provide an API response to the app running on the client device.

At 414, the user device (e.g., app) may display the custom offer generated by the offer generation service. The app (e.g., GUI) is designed to enable the user to accept a conformation for the offered service.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant ML models will be developed and the scope of the term ML model is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases “ranging/ranges between” a first indicate number and a second indicate number and “ranging/ranges from” a first indicate number “to” a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of processing a video for generating a graphical user interface (GUI) presenting personalized services for cleaning a property, comprising:
- receiving the video captured by a camera depicting an interior of the property comprising a plurality of rooms;
- extracting frame-level features from a plurality of frames of the video on a per-frame basis;
- generating structured frame-level metadata from the plurality of frame-level features on the per-frame basis;
- clustering a plurality of the structured frame-level metadata into a plurality of clusters according to a type of room;
- temporally aggregating the structured frame-level metadata of the frames of each cluster corresponding to each type of room to generate a structured room-level metadata for each room represented by each cluster;
- feeding each structured room-level metadata into at least one ML model for predicting at least one cleaning task and a corresponding duration for completing each cleaning task; and
- generating and presenting on a display of a client terminal, the at least one cleaning task and corresponding estimated durations within the GUI.

2. The computer implemented method of claim 1, further comprising training the at least one ML model by generating a training dataset comprising a plurality of records, wherein a record includes:
- a sample structured room-metadata, and a ground truth of at least one sample cleaning task and corresponding duration for completing each sample cleaning task,
- wherein the sample structured room-level metadata is generated by:
  - receiving a video captured by a camera depicting an interior of a sample property comprising a plurality of sample rooms;
- extracting frame-level features from a plurality of frames of the video on a per-frame basis;
- generating structured frame-level metadata from the plurality of frame-level features on the per-frame basis;
- clustering a plurality of the structured frame-level metadata into a plurality of clusters according to a type of room; and
- temporally aggregating the structured frame-level metadata of the frames of each cluster corresponding to each type of room to generate the sample structured room-level metadata for each room represented by each cluster; and
- training the ML model on the training dataset for predicting at least one target cleaning task and a corresponding target duration for completing each target cleaning task in response to an input of a target structured cluster-level metadata computed from a target video.

3. The computer implemented method of claim 1, wherein the frame-level features are extracted by: at least one of: feeding the frame into a room classification model to obtain a type of room, and feeding the frame into a detector model for detecting at least one object and at least one surface.

4. The computer implemented method of claim 3, wherein detecting at least one surface comprises detecting a plurality of different types of surfaces and classifying the plurality of different types of surfaces, including: floor, tables, beds, and counters, wherein the plurality of features are computed according to the plurality of different types of surfaces.

5. The computer implemented method of claim 1, wherein the plurality of frame-level features include at least a type of room, and the clustering is performed according to the types of rooms.

6. The computer implemented method of claim 1, further comprising:
- mapping features of the structured room-level metadata of each room to at least one cleaning task, to obtain a plurality of cleaning tasks for a plurality of rooms,
- wherein feeding comprises feeding each at least one cleaning task and corresponding structured room-level metadata into the ML model for estimating the duration for completing each cleaning task.

7. The computer implemented method of claim 1, wherein the GUI includes at least one interactive element for selecting a subset of at least one cleaning task, and for automatically scheduling a cleaning service for performing the selected subset of the at least one cleaning task.

8. The computer implemented method of claim 7, further comprising receiving a message from the client terminal in response to interaction with the interactive element presented in the GUI, and automatically scheduling the cleaning service for performing the selected subset of the at least one cleaning task.

9. The computer implemented method of claim 1, wherein the structured room-level metadata includes measured room size and/or measured room cleanliness.

10. The computer implemented method of claim 9, wherein the measured room cleanliness is computed as a combination of at least one of: number of objects to pick up, variety of different objects in the room, required sorting, required folding.

11. The computer implemented method of claim 1, wherein the at least one cleaning task comprise pre-defined cleaning tasks selected from: sweeping, mopping, dishwashing.

12. The computer implemented method of claim 1, wherein extracting is performed by a detector model implemented as a semantic segmentation model generating a plurality of classifications for pixels of the frame.

13. The computer implemented method of claim 1, wherein the room type is selected from: living room, kitchen, bedroom, bathroom, hallway, and office.

14. The computer implemented method of claim 1, wherein the video is captured by the camera integrated with and/or connected to a mobile device, and the at least one cleaning task is presented on the display of the mobile device.

15. The computer implemented method of claim 14, wherein the method is executed by a server in network communication with a plurality of mobile devices.

16. The computer implemented method of claim 1, further comprising feeding the at least one cleaning task, corresponding estimated durations, and at least one current parameter into a pricing engine configured for dynamically computing costs for performing each of the at least one cleaning task, and presenting the computed costs within the GUI on the display of the client terminal.

17. The computer implemented method of claim 16, wherein the at least one current parameter is selected from: base labor cost, regional adjustment, supply-demand factor, and discount as part of a promotion.

18. The computer implemented method of claim 1, further comprising pre-processing the plurality of frames of the video for normalizing resolution and/or lighting conditions.

19. The computer implemented method of claim 1, further comprising presenting within the GUI, a plurality of interactive elements configured for a user to enter feedback regarding the at least one cleaning task including actual duration to complete the at least one cleaning task, and performing an update of models for future predictions according to the feedback.

20. The computer implemented method of claim 1, further comprising generating and presenting on a display of a client terminal, at least one personalized message based on the at least one cleaning task and corresponding estimated durations within the GUI, the at least one personalized message selected from: a personalized advertisement, a personalized promotion, and a personalized bundle.

21. The computer implemented method of claim 1, further comprising:

computing a confidence score for the extracted frame-level features; and in response to the confidence score being below a threshold, dynamically presenting with the GUI, instructions within the GUI to at least one of: zoom in on specific areas, capture missing angles, and/or provide additional angular coverage, predicted to increase the confidence score, wherein the receiving the video, the extracting frame-level features, and the computing the confidence score, are iterated until the confidence score exceeds the threshold.

22. A system for processing a video for generating a graphical user interface (GUI) presenting personalized services for cleaning a property, comprising:

at least one processor executing a code for:

receiving the video captured by a camera depicting an interior of the property comprising a plurality of rooms;

extracting frame-level features from a plurality of frames of the video on a per-frame basis;

generating structured frame-level metadata from the plurality of frame-level features on the per-frame basis;

clustering a plurality of the structured frame-level metadata into a plurality of clusters according to a type of room;

temporally aggregating the structured frame-level metadata of the frames of each cluster corresponding to each type of room to generate a structured room-level metadata for each room represented by each cluster;

feeding each structured room-level metadata into a ML model for predicting at least one cleaning task and a corresponding duration for completing each cleaning task; and generating and presenting on a display of a client terminal, the at least one cleaning task and corresponding estimated durations within the GUI.

23. A computer implemented method of training a ML model for predicting at least one cleaning task and a corresponding duration for completing each cleaning task from a video, comprising:

generating a training dataset comprising a plurality of records, wherein a record includes:

a sample structured room-metadata, and a ground truth of at least one sample cleaning task and corresponding duration for completing each sample cleaning task, wherein the sample structured room-level metadata is generated by:

receiving a video captured by a camera depicting an interior of a sample property comprising a plurality of sample rooms;

extracting frame-level features from a plurality of frames of the video on a per-frame basis;

generating structured frame-level metadata from the plurality of frame-level features on the per-frame basis;

clustering a plurality of the structured frame-level metadata into a plurality of clusters according to a type of room;

temporally aggregating the structured frame-level metadata of the frames of each cluster corresponding to each type of room to generate the sample structured room-level metadata for each room represented by each cluster; and training the ML model on the training dataset for predicting at least one target cleaning task and a corresponding target duration for completing each target cleaning task in response to an input of a target structured cluster-level metadata computed from a target video.

* * * * *